(12) United States Patent
Takeda

(10) Patent No.: US 8,392,052 B2
(45) Date of Patent: Mar. 5, 2013

(54) VEHICLE INSPECTION APPARATUS

(75) Inventor: Toshihiko Takeda, Chiryu (JP)

(73) Assignee: Denso Corporation, Kariya (JP)

( * ) Notice: Subject to any disclaimer, the term of this patent is extended or adjusted under 35 U.S.C. 154(b) by 520 days.

(21) Appl. No.: 12/634,090

(22) Filed: Dec. 9, 2009

(65) Prior Publication Data

US 2010/0168955 A1 Jul. 1, 2010

(30) Foreign Application Priority Data

Dec. 26, 2008 (JP) ................................. 2008-333704

(51) Int. Cl.
- G01M 17/00 (2006.01)
- G06F 7/00 (2006.01)
- G06F 11/30 (2006.01)
- G06F 19/00 (2011.01)
- G07C 5/00 (2006.01)

(52) U.S. Cl. ..................... 701/29.1; 701/29.6; 701/29.7; 701/29.8; 701/30.2; 701/30.8

(58) Field of Classification Search ................ 701/33.1, 701/29.1, 29.6, 31.7, 31.8, 32.7, 32.9, 33.4, 701/33.7, 33.8, 34.3
See application file for complete search history.

(56) References Cited

U.S. PATENT DOCUMENTS

| | | | | | |
|---|---|---|---|---|---|
| 4,246,566 | A | * | 1/1981 | Endo et al. | 340/450.2 |
| 4,383,440 | A | * | 5/1983 | Murata | 73/114.25 |
| 4,432,145 | A | * | 2/1984 | Caroff | 33/288 |
| 4,441,359 | A | * | 4/1984 | Ezoe | 73/116.06 |
| 5,295,073 | A | * | 3/1994 | Celette | 701/32.5 |
| 5,430,645 | A | * | 7/1995 | Keller | 701/22 |
| 6,459,967 | B1 | * | 10/2002 | Otto | 701/29.1 |
| 6,856,940 | B2 | | 2/2005 | Loehr et al. | |
| 6,901,350 | B2 | | 5/2005 | Loehr et al. | |
| 7,020,595 | B1 | | 3/2006 | Adibhatla et al. | |
| 7,643,915 | B2 | * | 1/2010 | Jackson et al. | 701/31.4 |
| 2009/0193294 | A1 | * | 7/2009 | Nakamura et al. | 714/26 |

FOREIGN PATENT DOCUMENTS

| | | |
|---|---|---|
| JP | 62-126407 | 6/1987 |
| JP | 07-007504 | 1/1995 |
| JP | 2001-174366 | 6/2001 |
| JP | 2003-076582 | 3/2003 |
| JP | 2003-099120 | 4/2003 |
| JP | 2005-067309 | 3/2005 |

OTHER PUBLICATIONS

Japanese Office Action dated Nov. 16, 2010, issued in corresponding Japanese Application No. 2008-333704 with English Translation.

* cited by examiner

*Primary Examiner* — Khoi Tran
*Assistant Examiner* — Nicholas Kiswanto
(74) *Attorney, Agent, or Firm* — Nixon & Vanderhye P.C.

(57) ABSTRACT

The vehicle inspection apparatus is for inspecting behavior of at least one control object mounted on a vehicle whose behavior is controlled through behavior control performed by a control section included in a control system mounted on the vehicle in accordance with a behavior request inputted from an external device. The vehicle inspection apparatus includes a behavior judging section to judge whether or not the control object is abnormal on the basis of a detected behavior value of the control object and an estimated behavior value of the control object, whose dimensions have been matched with each other.

17 Claims, 9 Drawing Sheets

VEHICLE INSPECTION APPARATUS

CROSS-REFERENCE TO RELATED APPLICATION

This application is related to Japanese Patent Application No. 2008-333704 filed on Dec. 26, 2008, the contents of which are hereby incorporated by reference.

BACKGROUND OF THE INVENTION

1. Field of the Invention

The present invention relates to a vehicle inspection apparatus for inspecting behaviors of control objects mounted on a vehicle.

2. Description of Related Art

There are known various vehicle control systems including means for inspecting control objects mounted on a vehicle. For example, Japanese Patent Application Laid-open No. 2003-99120 discloses a vehicle control system in which its inspecting process is organized hierarchically into different levels, and an inspecting function is set for each of the different levels. The lower level includes a distributed inspecting function provided for each of the respective control objects. The higher level includes an inspecting function includes a function of adjusting the distributed inspecting function of the lower level. For example, each distributed inspecting function of the lower level supplies status information thereof to the inspecting function of the higher level, and the inspecting function of the higher level supplies the status information supplied from each distributed inspecting function of the lower level to a diagnostic unit.

However, even in the above vehicle control system where the inspecting process is hierarchized, since each of the inspecting processes performed by the distributed inspecting functions of the lower level is specific to its associated one of the control objects, when there is change in the control objects mounted on the vehicle, it is necessary to modify the inspecting processes regardless of vehicle types being the same or different. In addition, in a case where the higher level also performs inspecting processes for the control objects, if there is change such as addition, deletion or replacement in the control objects, it is necessary to modify the inspection process performed in the higher level in accordance with this change.

In this case, if the vehicle control system is configured such that all of the inspecting processes including the ones not affected by the change in the control objects are modified, it takes a lot of time and labor to perform the modification. This disadvantage occurs irrespective of whether the inspecting process in the vehicle control system is hierarchized or not.

SUMMARY OF THE INVENTION

The present invention provides a vehicle inspection apparatus for inspecting behavior of at least one control object mounted on a vehicle whose behavior is controlled through behavior control performed by a control section included in a control system mounted on the vehicle in accordance with a behavior request inputted from an external device, comprising:

an associated inspection processing section set to perform an associated inspecting process associated with the control object; and an independent inspection processing section configured to perform an independent inspecting process not associated with and independent from the control object;

wherein the associated inspection processing section includes:

a behavior detecting section to detect, as a behavior detection value, behavior of the control object reflecting a control command value outputted from the control section;

a behavior estimating section to estimate, as a behavior estimation value, behavior of the control object on the basis of the behavior request; and a dimension matching section to match dimensions of physical values of the behavior detection value and the behavior estimation value with each other;

and wherein the independent inspection processing section includes a behavior judging section to judge whether or not the control object is abnormal on the basis of a deviation between the behavior detection value and the behavior estimation value as a behavior deviation, whose dimensions have been matched with each other by the dimension matching section.

According to the present invention, there is provided a vehicle inspection apparatus which performs an inspecting process to inspect behaviors of control objects mounted on a vehicle, and has a structure which enables reducing amount of modification of the inspecting process necessary when there is addition, removal or replacement in the control objects mounted on the vehicle.

Other advantages and features of the invention will become apparent from the following description including the drawings and claims.

PREFERRED EMBODIMENTS OF THE INVENTION

First Embodiment

Figure 1:
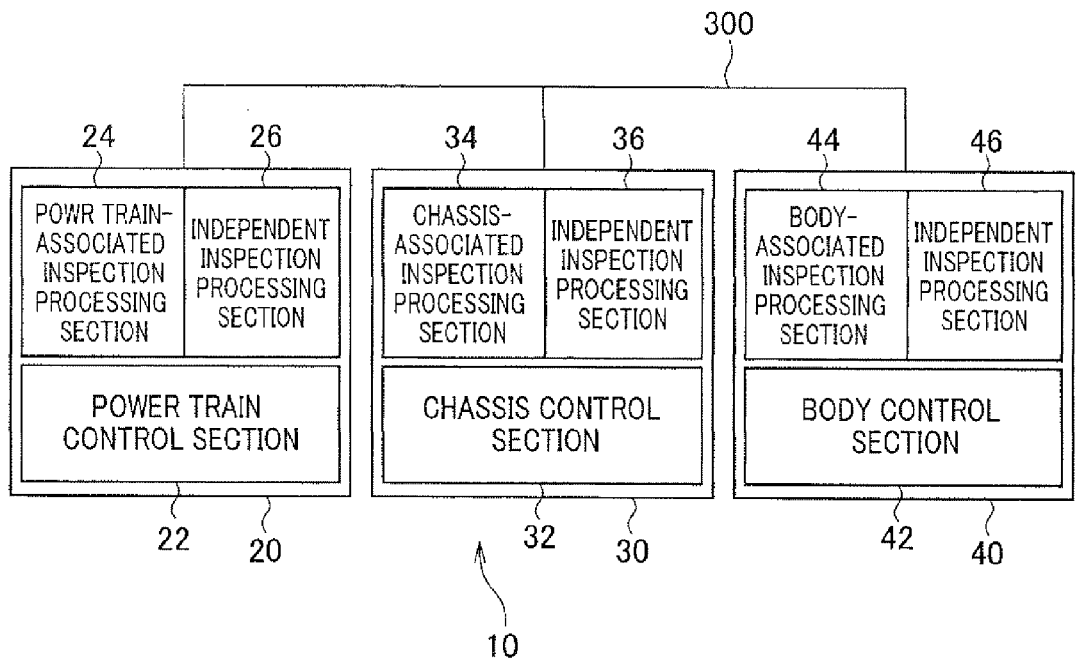
FIG. 1 is a block diagram schematically showing the structure of a vehicle control system including a vehicle inspection apparatus according to a first embodiment of the invention.

FIG. 1 is a diagram schematically showing the structure of a vehicle control system 10 including vehicle inspection apparatuses according to a first embodiment of the invention.

The vehicle control system 10 includes a power train ECU (Electronic Control Unit) 20, a chassis ECU 30 and a body ECU 40. The power train ECU 20, chassis ECU 30 and body ECU 40 are functional domain ECUs which operate to control and inspect the behaviors of control objects mounted on a vehicle, together with a power train domain, a chassis domain and a body domain which are functional domains grouped in accordance with their vehicle control functions. The power train ECU 20, chassis ECU 30 and body ECU are connected so as to be communicatable with one another through an in-vehicle network 300 such as CAN (Controller Area Network) or FlexRay (registered trademark of Daimler Chrysler).

Although not shown in the drawings, the vehicle control system 10 includes other functional domains such as the one for controlling not shown audio devices. The functional domains may be grouped in a way different from the above way, and the control objects included in each functional domain may be determined arbitrarily.

The power train ECU 20 includes a power train control section 22, a power train-associated inspection processing section 24 and an independent inspection processing section 26.

The power train control section 22 performs a behavior control on injectors, a transmission, etc. as control objects. The power train-associated inspection processing section 24 and the independent inspection processing section 26 constitute one of the vehicle inspection apparatuses which inspects the behaviors of the injectors, transmission, etc. constituting the power train as control objects.

The chassis ECU 30 includes a chassis control section 32, a chassis-associated inspection processing section 34 and an independent inspection processing section 36. The chassis control section 32 performs behavior control on the steering device, brake device, etc. as control objects. The chassis-associated inspection processing section 34 and the independent inspection processing section 36 constitute another one of the vehicle inspecting apparatuses which inspects the behaviors of the steering device, brake device, etc. as control objects constituting the chassis.

The body ECU 40 includes a body control section 42, a body-associated inspection processing section 44 and an independent inspection processing section 46. The body control section 42 performs behavior control on an air conditioner, doors, etc. as control objects. The body-associated inspection processing section 44 and the independent inspection processing section 46 constitute another one of the vehicle inspecting apparatuses which inspects the behaviors of the air conditioner, doors, etc. constituting the body of the vehicle.

In each of the above functional domain ECUs, the associated inspection processing section, the independent inspection processing section and the control section may be constituted of the same microcomputer, or different microcomputers.

Next, the structure of the vehicle inspection apparatus common to the power train domain, chassis domain and body domain is explained with reference to FIG. 2.

Figure 2:
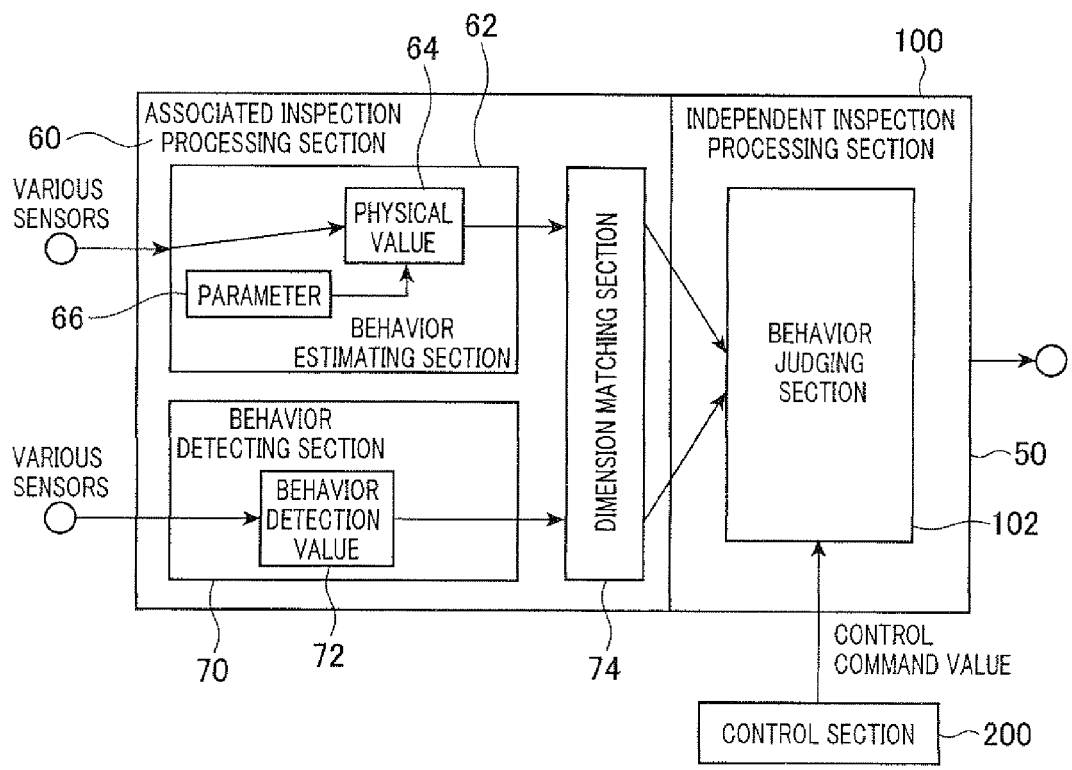
FIG. 2 is a block diagram schematically showing the structure of the vehicle inspection apparatus.

As shown in FIG. 2, the vehicle inspection apparatus 50 of each domain ECU inspects the behaviors of the individual control objects of each domain, or the overall behavior of each domain. The vehicle inspection apparatus 50 includes an associated inspection processing section 60 which performs an inspection processes associated with the structure or function for each of the control objects, and the independent inspection processing section 100 which performs an independent inspection process not associated with the structure or function of any of the control objects. The vehicle inspection apparatus 50 is constituted of a microcomputer including a CPU, ROM, RAM, and a flash memory.

Figure 5:
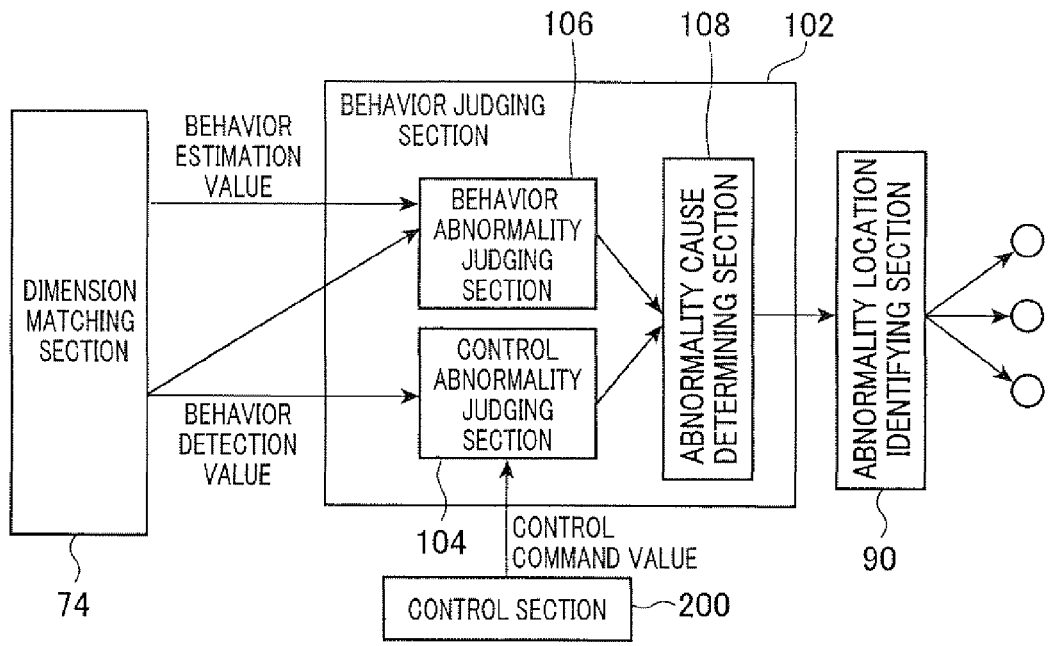
FIG. 5 is a block diagram for explaining an abnormality location identifying process performed by the vehicle inspection apparatus.
Figure 6:
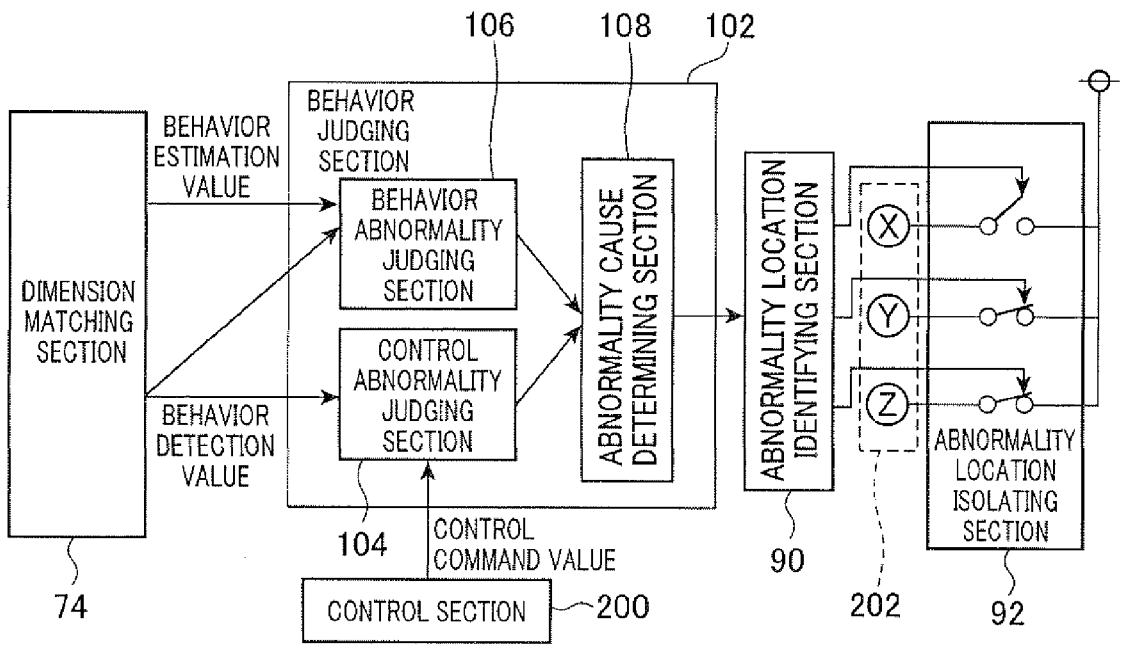
FIG. 6 is a block diagram for explaining an abnormality location isolating process performed by the vehicle inspection apparatus.
Figure 7:
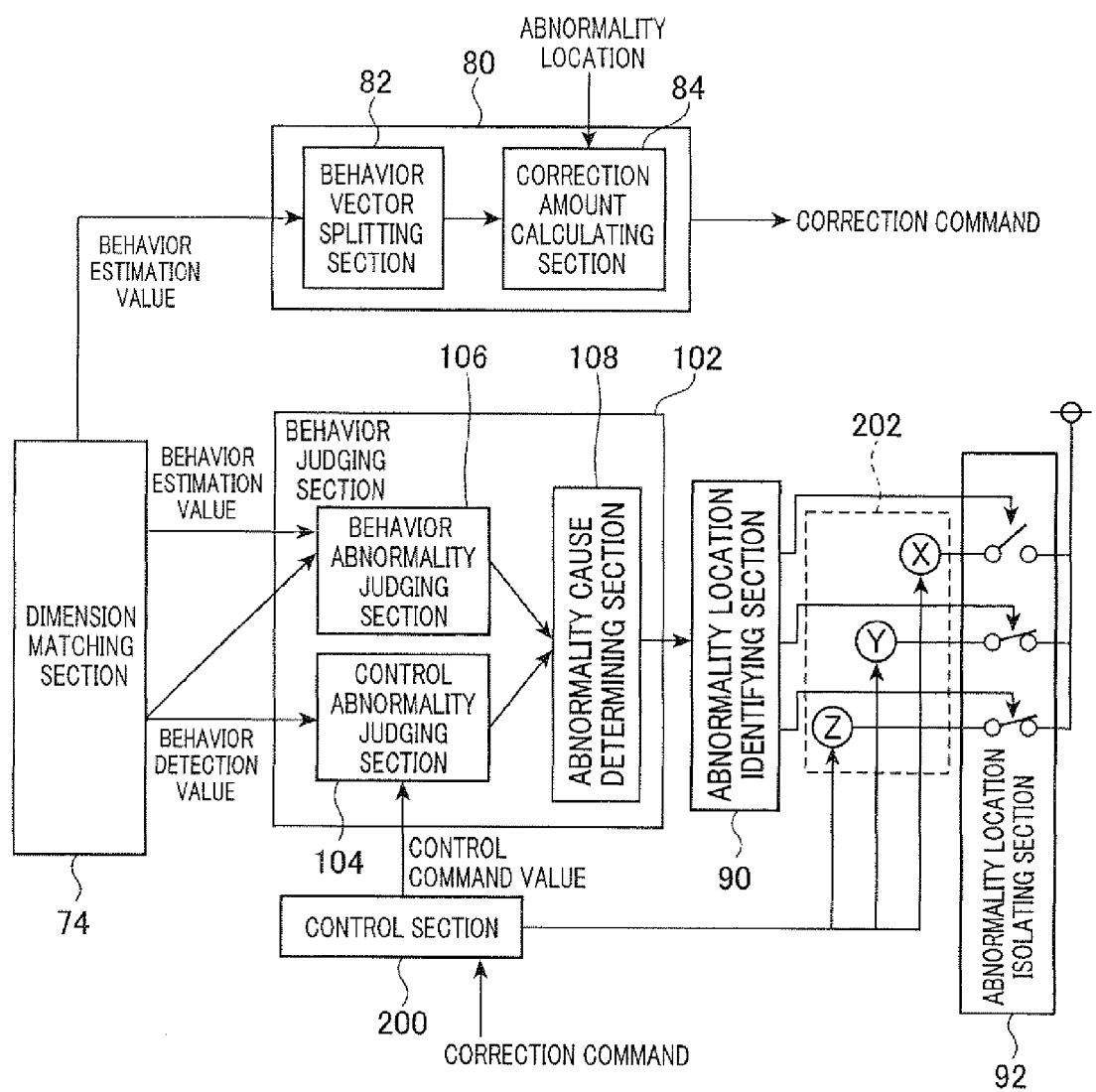
FIG. 7 is a block diagram for explaining the correction command process performed by the vehicle inspection apparatus after completion of the abnormality location isolating process.

The associated inspection processing section 60 includes a behavior estimating section 62 for estimating the behavior of each control object, a behavior detecting section 70 for detecting the behavior of each control object, a correction commanding section 80 (see FIGS. 4 and 7), an abnormality location identifying section 90 (see FIGS. 5 to 7), and an abnormality location isolating section (see FIGS. 6 and 7). The associated inspection processes performed respectively by the behavior estimating section 62, behavior detecting section 70, correction commanding section 80, abnormality location identifying section 90 and abnormality location isolating section 92 are associated with the structures or functions of the respective control objects, and accordingly, they differ depending on their control objects. Therefore, the process program of the associated inspection processing section 60 is modified when there is a change in the control objects to be inspected. Also, sensor signals inputted to the associated inspection processing section 60 may be changed when there is a change in the control objects to be inspected. Further, the hardware structure of the associated inspection processing section 60 may be modified when there is a change in the control objects to be inspected. As explained above, the associated inspection process performed by the associated inspection processing section 60 is set depending on the control objects to be inspected.

Next, the behavior estimating section 62 and the behavior detecting section 70 of the associated inspection processing section 60 are explained. The correction commanding section 80, abnormality location identifying section 90 and abnormality location isolating section 92 are explained after explaining the independent inspection processing section 100.

The behavior estimating section 62 estimates the behaviors of the control objects on the basis of a physical model 64 set for each control object as an estimation model, the physical model 64 being inputted with a behavior request as an input value, and a parameter 66 which is unique to the vehicle and characterizes the physical model 64. The parameter 66 may be the weight of the vehicle. The estimated behavior varies depending on the weight of the vehicle even for the same physical model.

The behavior request inputted from the behavior estimating section 62 to the physical model 64 may be a sensor signal outputted from a steering angle sensor, an accelerator pedal sensor, a brake pedal sensor, an engine cooling water temperature sensor, etc. For example, to perform hydraulic control of the brake device in which the hydraulic oil pressure applied to the brake wheel cylinders is controlled by a hydraulic control circuit constituted of electromagnetic valves etc., the behavior estimating section 62 inputs the sensor signal outputted from a brake pedal sensor indicative of the depression amount of the brake pedal to the physical model as the behavior request to estimate the hydraulic pressure applied to each brake wheel cylinder on the basis of the output of this physical model supplied with the vehicle parameter such as the weight of the vehicle. The behavior request inputted to the physical model 64 may be a steering control signal outputted from an ECU which controls an automatic parking system on the basis of the output of a vehicle-mounted camera. In this embodiment, the estimated value of the behavior can be regarded as a target value with respect to a behavior request from the driver of the vehicle or a corresponding vehicle-mounted control device.

The behaviors of the control objects may be estimated by referring to a data base of behavior patterns of the control objects determined by simulation or the like and stored in a storage device, instead of using the physical models.

The vehicle inspection apparatus 50 of this embodiment is configured such that the behaviors of the control objects are inspected collectively for each of the functional domains. This makes it possible not only to estimate the behaviors of the individual control objects such as the steering device and the brake device, but also to estimate a combined behavior of the control objects of the same functional domain.

The behavior detecting section 70 detects, as a behavior value 72, the behavior of each control object which a control section 200 controls in accordance with a behavior request, on the basis of a sensor signal varying depending on the behavior of the control object to be inspected. The behavior detecting section 70 is inputted with different sensor signals from different control objects. For example, the behavior detecting section 70 is inputted with sensor signals from a vehicle longitudinal acceleration sensor and a vehicle speed sensor, and detects the longitudinal acceleration and the speed of the vehicle on the basis of the sensor signals.

As explained above, since the vehicle inspection apparatus 50 of this embodiment is configured such that the behaviors of the control objects are inspected collectively for each of the functional domains, it is possible not only to estimate the behaviors of the individual control objects such as the steering device and the brake device, but also to estimate a combined behavior of the control objects of the same functional domain. Therefore, according to this embodiment, it is possible to detect the behavior of each domain by use of not the individual sensor signals of the plurality of the control objects but a sensor signal showing a combined behavior of the plurality of the control objects.

For example, in the case of the chassis domain, the behavior detecting section 70 detects tire distortion of the basis of the output of a distortion sensor. Tire distortion occurs from the combined behavior of the steering device, brake device, etc of the chassis domain while the vehicle travels around a curve, for example. By performing the behavior inspection on a functional domain-to-functional domain basis, it becomes possible to detect easily a combined behavior of the plurality of the control objects from one sensor signal, for example.

A dimension matching section 74 is configured to match the dimensions (or units) of a behavior estimation value estimated by the behavior estimating section 62, a behavior detection value detected by the behavior detecting section 70, and a control command outputted from the control section 200 to control the behaviors of the control objects to one another. In this embodiment, since the dimensions of the quantity values of the behavior estimation value and the behavior detection value are matched with the dimension of the control command value outputted from the control section 200, the control command value outputted from the control section 200 is not inputted to the dimension matching section 74.

By matching the dimensions of the behavior estimation value and the behavior detection value with the dimension of the control command value in the dimension matching section 74, it becomes possible for a behavior judging section 102 (to be explained later) of the independent inspection processing section 100 to handle the behavior estimation value, the behavior detection value and the control command value as mere numerical values.

In some cases, the dimension matching section 74 does not simply convert the units of the physical quantities, but converts a plurality of behavior detection values which the behavior detecting section 70 detects from sensor signals into a single behavior detection value by performing vector synthesis on the plurality of the behavior detection values. For example, the dimension matching section 74 converts the vehicle speed and the longitudinal acceleration of the vehicle as behavior detection values detected by the behavior detecting section 70 into a hydraulic pressure of each brake wheel cylinder to match the dimensions of these behavior detection values with respect to the dimension of the hydraulic pressure of the brake wheel cylinder estimated by the behavior estimating function 62.

The independent inspection processing section 100 performs the independent inspection process to judge whether the behaviors of the control objects are normal or not. The independent inspection process performed by the independent inspection processing section 100 is not associated with, and independent from the structure or function of any control object, and accordingly, it is common and the same to all of the different control objects.

The behavior judging section 102 of the independent inspection processing section 100 compares the behavior estimation value with the behavior detection value whose dimensions have been matched with each other by the dimension matching section 74 of the relevant inspection processing section 60, to judge whether the behavior of the control object being inspected is abnormal or not on the basis of the difference between them. Since the dimensions of the behavior estimation value and the behavior detection value are matched with each other by the dimension matching section 74 of the relevant inspection processing section 60, the behavior judging section 102 can compare them as numerical values not associated with any control object.

The behavior judging section 102 not only judges whether the behavior of each of the individual control objects is abnormal or not on the basis of behavior deviation of the control object being inspected, but also judges whether the behavior of the functional domain in which the control object being inspected is included is abnormal or not on the basis of behavior deviation of this functional domain resulting from a combination of the behaviors of the control objects included in this functional domain. The behavior judging section 102 is configured to judge the behavior to be normal when the behavior deviation is within a predetermined range, and judge the behavior to be abnormal when the behavior deviation exceeds the predetermined range. Since the behavior estimation value and behavior detection value are inputted to the independent inspection processing section 100 from the relevant inspection processing function 60, the relevant inspection processing section 60 knows that the behavior judging section 102 is being inputted with the behavior estimation value and behavior detection value of which one of the control objects to perform the behavior judgment.

The behavior judging section 102 may be configured to judge whether the behavior of the control object being inspected is abnormal or not on the basis of whether the difference between the behavior estimation value and the behavior detection value exceeds a predetermined value or not. This abnormality judgment on the basis of the difference between the behavior estimation value and the behavior detection value without regard to their units is independent from any of the control objects.

The behavior judging section 102 may be configured to judge whether the behavior of the control object being inspected is abnormal or not on the basis of the ratio between the behavior estimation value and the behavior detection value. The ratio between the behavior estimation value and the behavior detection value is a unitless value. Also, the ratio between the behavior estimation value and the behavior detection value is a value independent from the magnitudes of the behavior estimation value and the behavior detection value. For example, the ratio is 0.8 when the behavior estimation value is 80 and the behavior detection value is 100, and also when the behavior estimation value is 8, and the behavior detection value is 10 (their units being omitted). Accordingly, in this case, it is possible to make the abnormality judgment without regard to the extent of discrepancy between the behavior estimation value and the behavior detection value.

When it is judged that there exists a behavior abnormality in accordance with the discrepancy between the behavior estimation value and the behavior detection value, it is preferable to determine whether the behavior abnormality is due to abnormality in the control system controlling the behaviors of the control objects, or an occurrence of an unexpected event related to the running environment of the vehicle. This is to eliminate the behavior abnormality by correcting the control command value outputted to the control object having been inspected from the control section 200 in accordance with the cause of the behavior abnormality.

Figure 3:
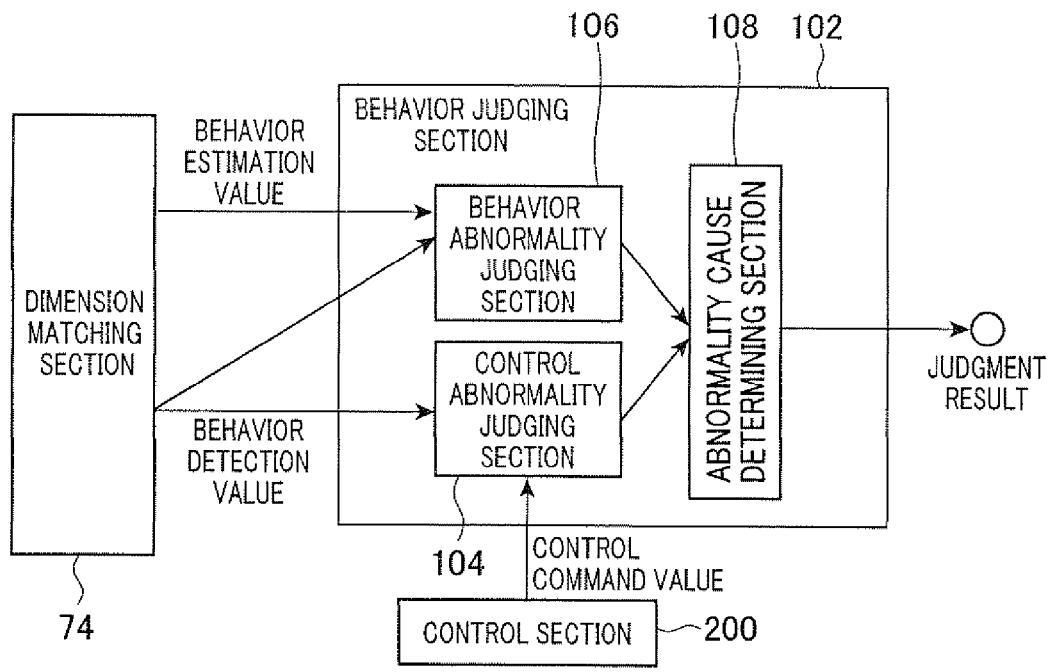
FIG. 3 is block diagram for explaining a behavior judging process performed by the vehicle inspection apparatus.

Accordingly, it is preferable that the abnormality judgment is made by the behavior judging section 102 of the independent inspection processing section 100 constituted of a control abnormality judging section 104, a behavior abnormality judging section 106 and an abnormality cause determining section 108 as shown in FIG. 3.

The control abnormality judging section 104 judges whether the control system 200 is abnormal or not in accordance with whether the discrepancy between the control command value outputted to the control object being inspected from the control section 200 and the behavior detection value of this control object whose dimension is matched with that of the control command value by the dimension matching section 74 is within a predetermined range. In this case, the control abnormality judging section 104 may make the abnormality judgment on the basis of the difference between the control command value and the behavior detection value as a control deviation, or on the basis of the ratio between the difference between the control command value and the behavior detection value. Since the dimension of the behavior detection value is matched with that of the control command value by the dimension matching section 74 of the associated inspection processing section 60, the control abnormality judging section 104 can compare them as numerical values not associated with any of the control objects.

The behavior abnormality judging section 106 judges whether the behavior of the control object or the functional domain being inspected is abnormal or not on the basis of the discrepancy between the behavior estimation value and the behavior detection value whose dimension are matched with each other by the dimension matching section 74 of the associated inspection processing section 60. In this case, the control abnormality judging section 106 may make the abnormality judgment on the basis of the difference between the behavior estimation value and the behavior detection value as a control deviation, or on the basis of the ratio between the difference between the behavior estimation value and the behavior detection value.

The abnormality cause determining section 108 determines whether the cause of the behavior abnormality in which the discrepancy between the behavior estimation value and the behavior detection value exceeds the predetermined value is due to the control system, or due to an occurrence of an unexpected event related to the running environment of the vehicle.

When the behavior abnormality judging section 106 judges an occurrence of a behavior abnormality because of the discrepancy between the behavior estimation value and the behavior detection value, and the control behavior judging section 104 judges that there is an abnormality in the control system because of the discrepancy between the control command value and the behavior detection value, the abnormality cause determining section 108 determines that the cause of the behavior abnormality is in the control object being inspected or the behavior control performed on this control object by the control function 200.

The following is an example how the abnormality cause determining section 108 performs the abnormality cause determining process on the brake hydraulic pressure control. Here, it is assumed that the hydraulic pressure of each brake wheel cylinder which the behavior estimating section 62 estimates from the depression amount of the brake pedal as a behavior request with reference to the physical model 64 is an behavior estimation value, the hydraulic pressure of each brake wheel cylinder converted from the vehicle speed and the longitudinal acceleration of the vehicle by the dimension matching section 74 is a behavior detection value, and the hydraulic pressure of each brake wheel cylinder is a control command value. When the behavior abnormality judging section 106 judges an occurrence of a behavior abnormality because of the discrepancy between the behavior estimation value and the behavior detection value, and the control abnormality judging section 104 determines that there is a discrepancy between the behavior detection value and the control command value, the abnormality cause determining section 108 determines that the cause of the behavior abnormality is in the control system. However, the abnormality cause determining section 108 cannot determine which of the control object being inspected and the control section 200 is abnormal only from the judging results by the control abnormality judging section 104 and the behavior abnormality judging section 106.

As explained above, in the case of the control system being abnormal, the abnormality location identifying section 90 of the associated inspection processing section 60 identifies the abnormality location in the control system on the basis of the judging result by the abnormality cause determining section 108 and diagnosis result of each control object, and isolates the abnormality location from the control system as necessary. In this state where the abnormality location is isolated from the control system, as explained above, the correction commanding section 80 of the associated inspection processing section 60 calculates a correction amount of the control command value for the control section 200 to control the behavior of the control object having been inspected.

On the other hand, in the case where the control abnormality judging section 104 judges that the control system is normal because of good agreement between the control command value and the behavior detection value, and the behavior abnormality judging section 106 judges that the behavior of the functional domain being inspected is abnormal because of the discrepancy between the behavior estimation value and the behavior detection value, the abnormality cause determining section 108 determines that every control object is working normally in accordance with the control command from the control section 200, however the behavior of the functional domain as a combination of the behaviors of some of the control objects is abnormal due to unexpected change of the running environment of the vehicle, or the like.

For example, when the road surface on which the vehicle is running is partially frozen, and one of the right side and left side tires of the vehicle runs on a frozen portion of the road surface, there may occur a case in which although the behavior values of the steering device and the brake device of the chassis domain approximately match their corresponding control command values from the control sections 200, respectively, the behavior estimation value of tire distortion does not match the behavior detection value of tire distortion detected by the distortion sensor because of slippage of the vehicle. In this case, the abnormality cause determining section 108 determines that the behaviors of the relevant control objects are normal, but there is an abnormality in tire distortion of the vehicle.

As exemplified above, when the behavior of the functional domain as combination of the behaviors of the control objects being inspected is abnormal although the control system is normal, the correction commanding section 80 calculates a correction amount of the control command value outputted from the control section 200 to the relevant control objects so that the behavior of the functional domain becomes normal.

It can be assumed that there does not occur such a case where the behavior abnormality determining section 106 determines the behavior is normal because of good agreement between the behavior estimation value and the behavior detection value, while the control abnormality determining section 104 determines that the control system is abnormal because of discrepancy between the control command value and the behavior detection value.

Next, the inspection process performed by the correction commanding section 80 of the associated inspection processing section 60, the abnormality location identifying section 90 and the abnormality location isolating section 92 is explained with reference to FIGS. 4 to 7.

Figure 4:
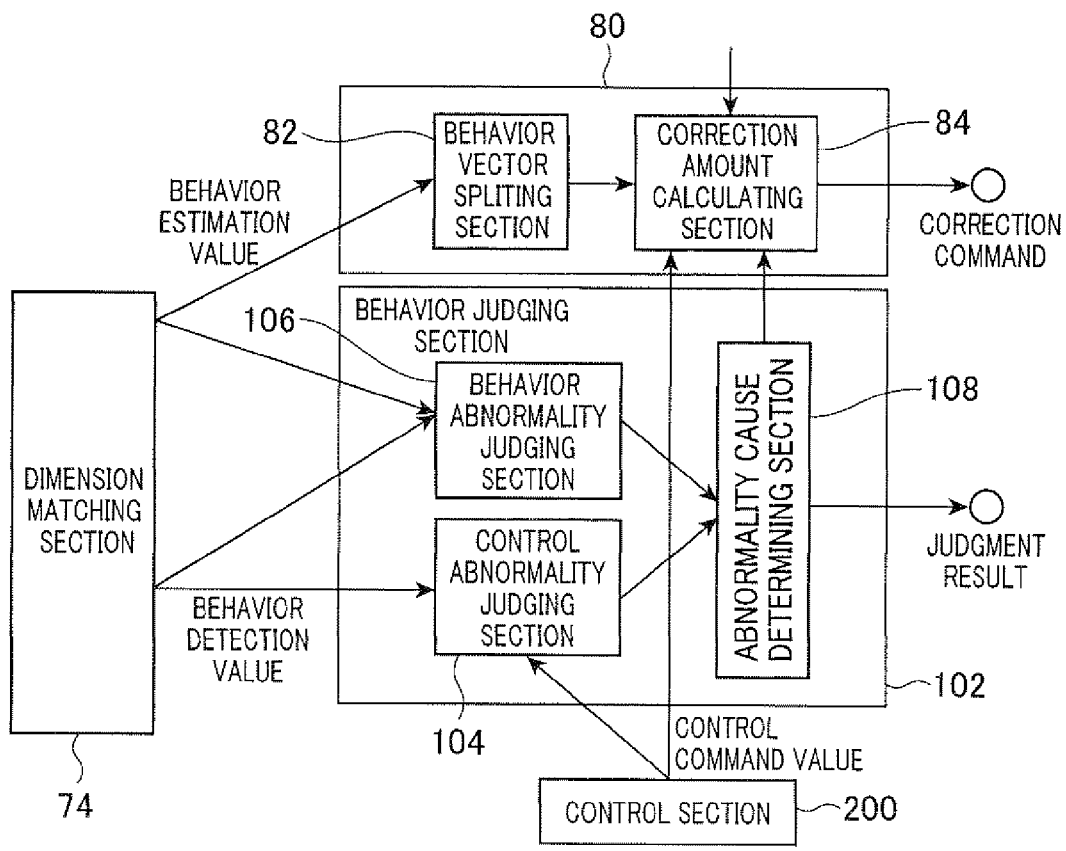
FIG. 4 is a block diagram for explaining a correction commanding process performed by the vehicle inspection apparatus.

As shown in FIG. 4, the correction commanding section 80 includes a behavior vector splitting section 82 and a correction amount calculating section 84. When the behavior estimation value and the behavior detection value of the functional domain being inspected do not match with each other, the behavior vector splitting section 82 performs vector splitting on the magnitude and direction of the behavior estimation value of the functional domain inputted from the dimension matching section 74 for each of the relevant control objects. The behavior vector splitting function 82 may be inputted with the behavior estimation value from the behavior estimating section 62 when the dimension of the physical value of the behavior estimation value of the functional domain being estimated by the behavior estimating section 62 matches with the control command value. When the behavior estimation value of the respective one of the control objects being inspected does not match the corresponding behavior detection value, it is not necessary for the behavior vector splitting section 82 to perform vector splitting on the behavior estimation value because it is the value of the respective one of the control objects.

The correction amount calculating section 84 is inputted with the behavior correction values of the respective control objects being inspected and the corresponding control command values from the control section 200. Further, the correction amount calculating section 84 is inputted with the behavior deviation amount calculated by the behavior abnormality judging section 106, behavior abnormality judging result, abnormality cause information showing whether the cause of a behavior abnormality is due to an abnormality in the control system or an occurrence of an unexpected event although the control system is normal from the abnormality cause determining section 108, and inputted with information showing a location of the behavior abnormality from the abnormality cause identifying section 90. The correction amount calculating section 84 is a part of the associated inspection processing section 60, and accordingly, it knows for which of the control objects the behavior judging section 102 of the independent inspection processing section 100 has made the behavior abnormality judgment.

The correction amount calculating section 84 calculates a correction amount of the control command value outputted from the control section 200 to the abnormal control object on the basis of the behavior deviation amount, abnormality cause information and abnormality location in order to make the behavior of the abnormal control object or the abnormal functional domain normal as much as possible. For example, when the brake wheel cylinder of the front right side wheel is abnormal and accordingly its hydraulic pressure does not rise, the correction amount calculating section 84 calculates a correction amount of a hydraulic pressure control command value for each of the remaining three normal brake wheel cylinders to prevent occurrence side slipping of the vehicle and to provide necessary braking force with regard to the abnormality in the hydraulic pressure of the front right side brake.

On the other hand, in a case where although the control system is normal, there is occurring a behavior abnormality due to unexpected change of the running environment of the vehicle, for example, in a case where although the hydraulic pressure of each brake wheel cylinder is at a normal level in accordance with the hydraulic pressure control command value from the control section 200, the vehicle is side-slipping, the correction amount calculating section 84 calculates a correction amount of the hydraulic pressure control command value for each of the tires to provide an optimum tire grip force to thereby stop the vehicle from side-slipping.

The correction amount calculating section 84 commands the control section 200 to perform the behavior control on each of the relevant control objects in accordance with the calculated correction amount. The difference or the rate between the behavior estimation value and the behavior detection value may be determined as the calculated correction amount as-is or after being converted depending on the control object being inspected.

When the abnormality location of the control object is to be isolated, the correction commanding section 80 is inputted with information showing the abnormality location from the abnormality location identifying section 90, and as shown in FIG. 7, calculates a correction amount of the control command value outputted from the control section 200 to the control object 202 or the functional domain from which the abnormality location has been isolated in order to make the behavior of the abnormal control object or the abnormal functional domain normal as much as possible. In FIG. 7, the abnormality location is shown by "X". When the brake wheel cylinder of the front right side wheel is abnormal, it is isolated from the hydraulic pressure control to bring its hydraulic pressure to zero, and then the correction commanding section 80 calculates a correction amount of the hydraulic pressure command value for each of the remaining three normal brake wheel cylinders. Subsequently, the correction commanding section 80 commands the control section 200 to perform the behavior control on each of the relevant the control objects in accordance with the calculated correction amount.

The abnormal location identifying section 90 of the associated inspection processing section 60 shown in FIG. 5 identifies the abnormality location in the control system on the basis of the results of diagnosis of the respective control objects other than the behavior inspection to the vehicle when the determination result by the abnormality cause determining section 108 shows that the control system is abnormal. The abnormal location identifying section 90 may use the behavior estimation value and the behavior detection value to identify the abnormality location. The abnormality location is either in the control object or in the control by the control section 200.

For example, when it is determined that the hydraulic pressure of one of the brake wheel cylinders detected as a behavior detection value is abnormal on the basis of the diagnosis result of the brake wheel cylinders and the hydraulic pressure control circuit for the four-wheel brake system although a hydraulic pressure control signal at an appropriate signal level is being transmitted from the control section 200 to the hydraulic pressure control circuit, the abnormality location identifying section 90 identifies that the cause of the abnormality is in at least one of the brake wheel cylinders or in the hydraulic pressure control circuit. On the other hand, if the signal level of the hydraulic pressure control signal being transmitted from the control section 200 to the hydraulic pressure control circuit is fixed at "High" or "Low" level, the abnormal location identifying section 90 identifies that the hydraulic pressure control signal transmitted from the control section 200 is abnormal. In this case, the abnormal location identifying section 90 commands the abnormality location isolating section 92 to inhibit the hydraulic pressure control circuit from performing the hydraulic pressure control by inhibiting the control section 200 from executing an abnormal part of the process program, for example.

The abnormality location isolating section 92 of the associated inspection processing section 60 shown in FIG. 6 performs an abnormality location isolating process to isolate the abnormality location identified by the abnormality location identifying section 90. For example, the abnormality location isolating section 92 isolates the abnormality location shown by "X" in FIG. 6 by interrupting electric power supply to the abnormality location "X". When there is a location operating in conjunction with the abnormality location, these locations may be isolated together as one group. For example, when the hydraulic pressure of the brake wheel cylinder of the front right side wheel is abnormal, the brake wheel cylinder of the rear left side wheel sharing the same brake fluid pipe with the brake wheel cylinder of the front right side wheel may be isolated from the hydraulic pressure control together with the brake wheel cylinder of the front right side wheel to bring their fluid pressures to zero.

When the control by the control section 200 is abnormal, the abnormality location isolating section 92 isolates the abnormal control by the control section 200 by inhibiting the control section 200 from executing the abnormal part of the process program, for example.

Next, the structure of the microcomputer-based vehicle inspection apparatus 50 is explained.

Example 1

Figure 8A:
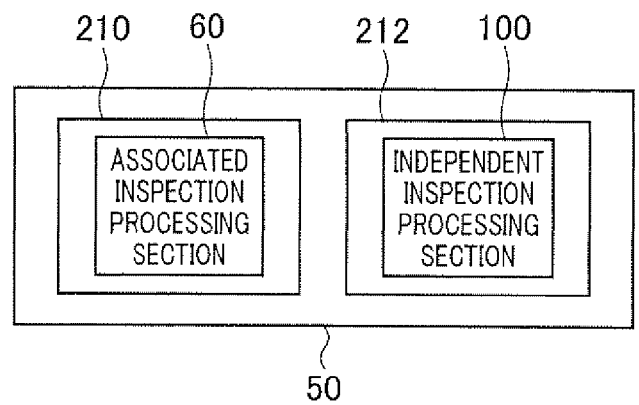
FIGS. 8A and 8B are block diagrams showing a first example of the structure of the vehicle inspection apparatus.

The associated inspection processing section 60 and the independent inspection processing section 100 of the vehicle inspection apparatus 50 may be respectively constituted of different microcomputer 210 and 212 as shown in FIG. 8A, and alternatively, they may be constituted of the same microcomputer 214 as shown in FIG. 8E. Incidentally, when the associated inspection processing section 60 and the independent inspection processing section 100 are constituted of the same microcomputer, their respective process programs stored in the same memory are executed by the same CPU under the administration of the same OS.

The following is an explanation of modification of the associated inspection processing section 60 in the case of change, addition, or deletion of the control objects constituting the same functional domain, or in the case of applying the vehicle inspection apparatus 50 to another functional domain, assuming that the associated inspection processing section 60 and the independent inspection processing section 100 are constituted of the same microcomputer, and their respective process programs are stored in the same memory.

In a development environment where program codes are automatically produced, only the function of the model set for the associated inspection processing section 60 is modified, and the memory is rewritten with the automatically produced program codes. On the other hand, when the development is carried out on a module program-to-module program basis, the memory is rewritten with the modified process program of the associated inspection processing section 60.

In either case, only the setting of the associated inspection processing section 60 is modified, and the setting of the independent inspection processing section 100 is not modified.

In the case where the relevant inspection processing function 60 and the independent inspection processing function 100 are constituted of different microcomputers, the relevant inspection processing function 60 is modified on a microcomputer-to-microcomputer basis.

Figure 8B:
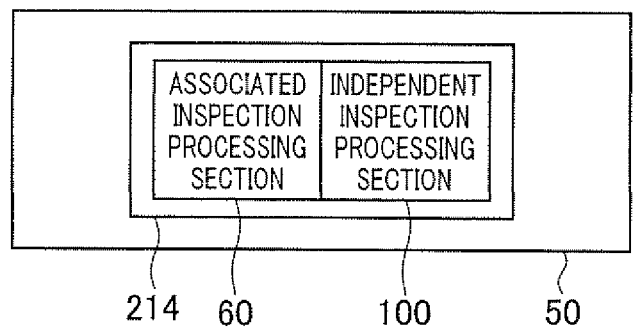

Incidentally, the probability of occurrence of an event that one of two microcomputers malfunctions causing an abnormality in the inspection process when the associated inspection processing section 60 and the independent inspection processing section 100 are respectively constituted of these two microcomputer is higher than the probability of occurrence of an event that a microcomputer malfunctions causing an abnormality in the inspection process when the associated inspection processing section 60 and the independent inspection processing section 100 are constituted of this same microcomputer. Further, as explained in the foregoing, each of the associated inspection processing section 60 and the independent inspection processing section 100 is inputted with the inspection result by the other of them. Accordingly, it is preferable that the associated inspection processing section 60 and the independent inspection processing section 100 are constituted of the same microcomputer as shown in FIG. 8B.

Example 2

Figure 9:
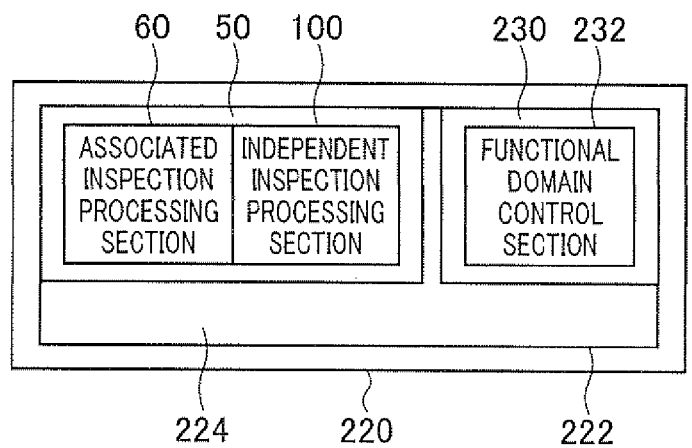
FIG. 9 is a block diagram showing a second example of the structure of the vehicle inspection apparatus.

As shown in FIG. 9, the vehicle inspection apparatus 50 and a functional domain control apparatus 230 including a functional domain control section 232 may be constituted of the same microcomputer 222 of a functional domain ECU 220. This makes it possible to reduce the number of microcomputers constituting the vehicle inspection apparatus 50 and the functional domain control apparatus 230.

In the case where the vehicle inspection apparatus 50 and the functional domain control apparatus 230 are constituted of the same microcomputer 222 and share the same storage device, it is preferable that the microcomputer 222 includes a protecting section 224 to prohibit one of the vehicle inspection apparatus 50 and the functional domain control apparatus 230 from writing to a storage area which the other of them refers to in order to enable them to perform their processes without interfering with each other.

Example 3

The above Example 2 has a problem in that when the microcomputer 222 malfunctions, both of the inspecting process and the behavior control on the same functional domain become disabled. On the other hand, if the vehicle inspection apparatus 50 and the functional domain control apparatus 230 are respectively constituted by different microcomputers to remove this problem, the manufacturing cost increases because of increase of the number of microcomputers.

Figure 10A:
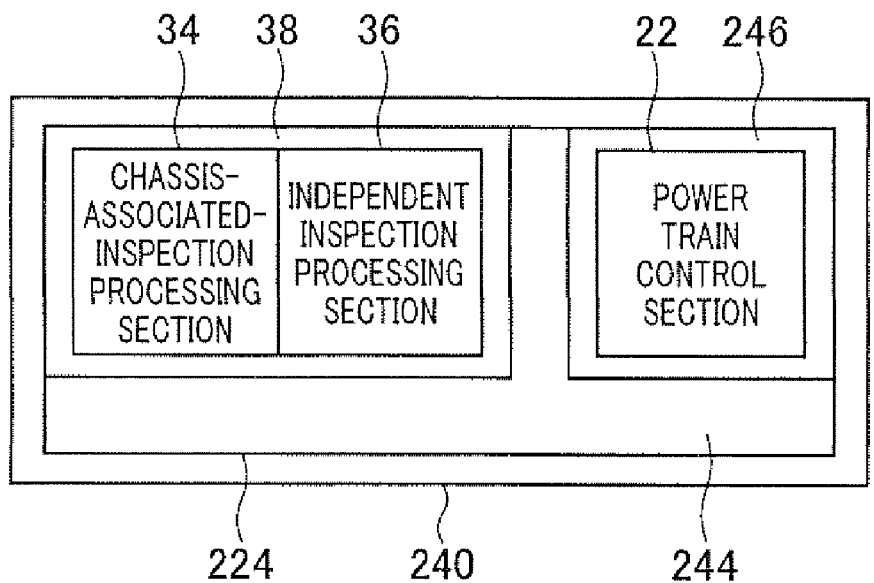
FIGS. 10A and 10B are block diagrams showing a third example of the structure of the vehicle inspection apparatus.
Figure 10B:
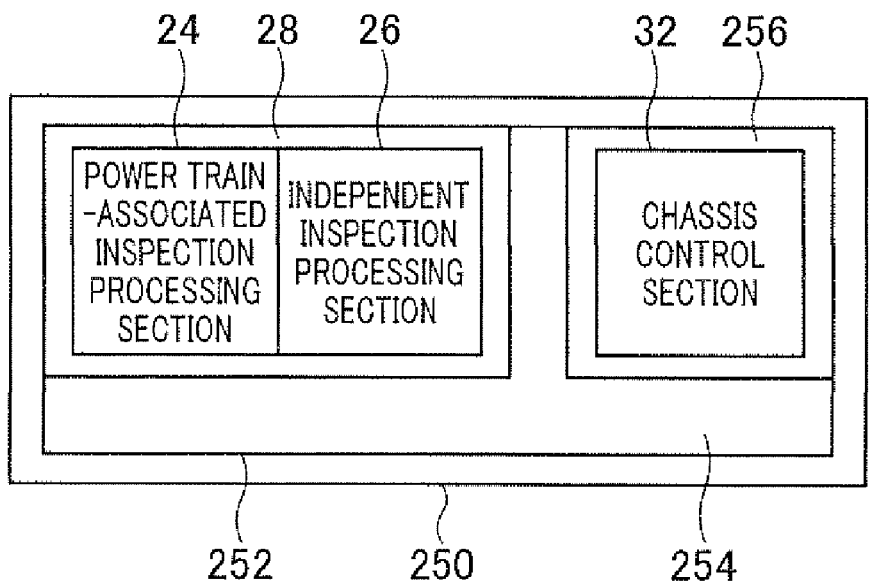

Hence, there may be used the structure shown in FIG. 10 in which a power train control apparatus 246 including a power train control section 22 to control the behavior of the power train domain and a vehicle inspection apparatus 38 to inspect the chassis domain are constituted of the same microcomputer 242 of one functional domain ECU 240, and a chassis control apparatus 256 including a chassis control section 32 to control the behavior of the chassis domain and a vehicle inspection apparatus 28 to inspect the power train domain are constituted of the same microcomputer 252 of the other functional domain ECU 250. The microcomputers 242 and 252 include protecting functions 244 and 254, respectively, which are similar to the above protecting function 224.

In accordance with the structure shown in FIG. 10, when there occurs a malfunction in one of the two microcomputers which constitutes one of the functional domain control apparatuses and one of the vehicle inspection apparatuses, it is possible to perform one of the behavior control on one of the functional domain and the inspection process on the other functional domain by the other of the functional domain control apparatuses and the other of the vehicle inspection apparatuses constituted of the other of the two microcomputers.

Example 4

Figure 11:
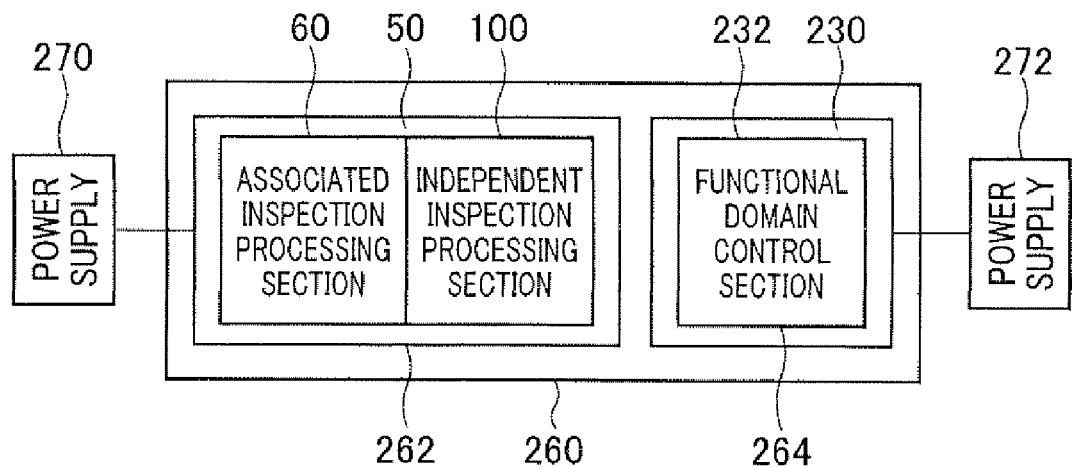
FIG. 11 is a block diagram showing a fourth example of the structure of the vehicle inspection apparatus.

When the vehicle inspection apparatus 50 and the functional domain control apparatus 230 are constituted of the same microcomputer 260 as shown in FIG. 11, it is preferable that the associated inspection processing section 60 and the independent inspection processing section 100 of the vehicle inspection apparatus 50, and the functional domain control section 232 of the functional domain control apparatus 230 are supplied with electric power from different power supplies 207 and 272, respectively, and implemented by different computation apparatuses 262 and 264, respectively. The computation apparatuses 262 and 264 may be constituted of the same CPU, or different cores of the same CPU.

According to the structure shown in FIG. 11, when one of the two computation apparatuses or one of the two power supplies malfunctions, the other can continue to operate.

Example 5

Figure 12:
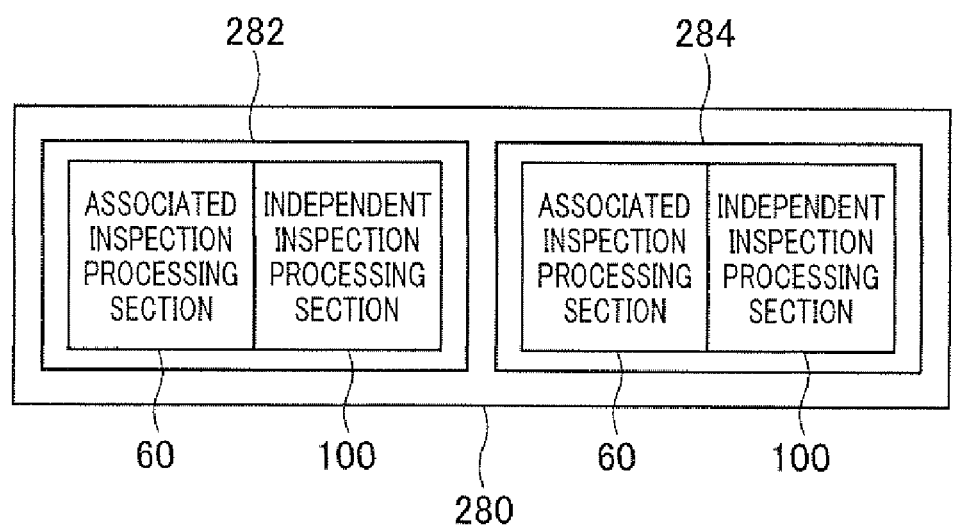
FIG. 12 is a block diagram showing a fifth example of the structure of the vehicle inspection apparatus.

A vehicle inspection apparatus 280 may have the structure shown in FIG. 12 in which two microcomputers 282 and 284 constitute the same two sets of the associated inspection processing sections 60 and the independent inspection processing sections 100. With the increase of the control objects to be inspected by the vehicle inspection apparatus 280, the vehicle inspection apparatus 280 is required to have higher reliability. By constituting the vehicle inspection apparatus 280 to have the redundant system by use of the two microcomputers 282 and 284, the vehicle inspection apparatus 280 can continue to perform the inspecting process even when one of the two microcomputers 282 and 284 malfunctions. In this example, the number of the microcomputers may be three or more. When the vehicle inspection apparatus 280 is constituted of a plurality of microcomputers as shown in FIG. 12, it is preferable that the microcomputers have different hardware structures and disposed at different positions in the vehicle in order to reduce the probability that these microcomputers malfunction at the same time.

Figure 13:
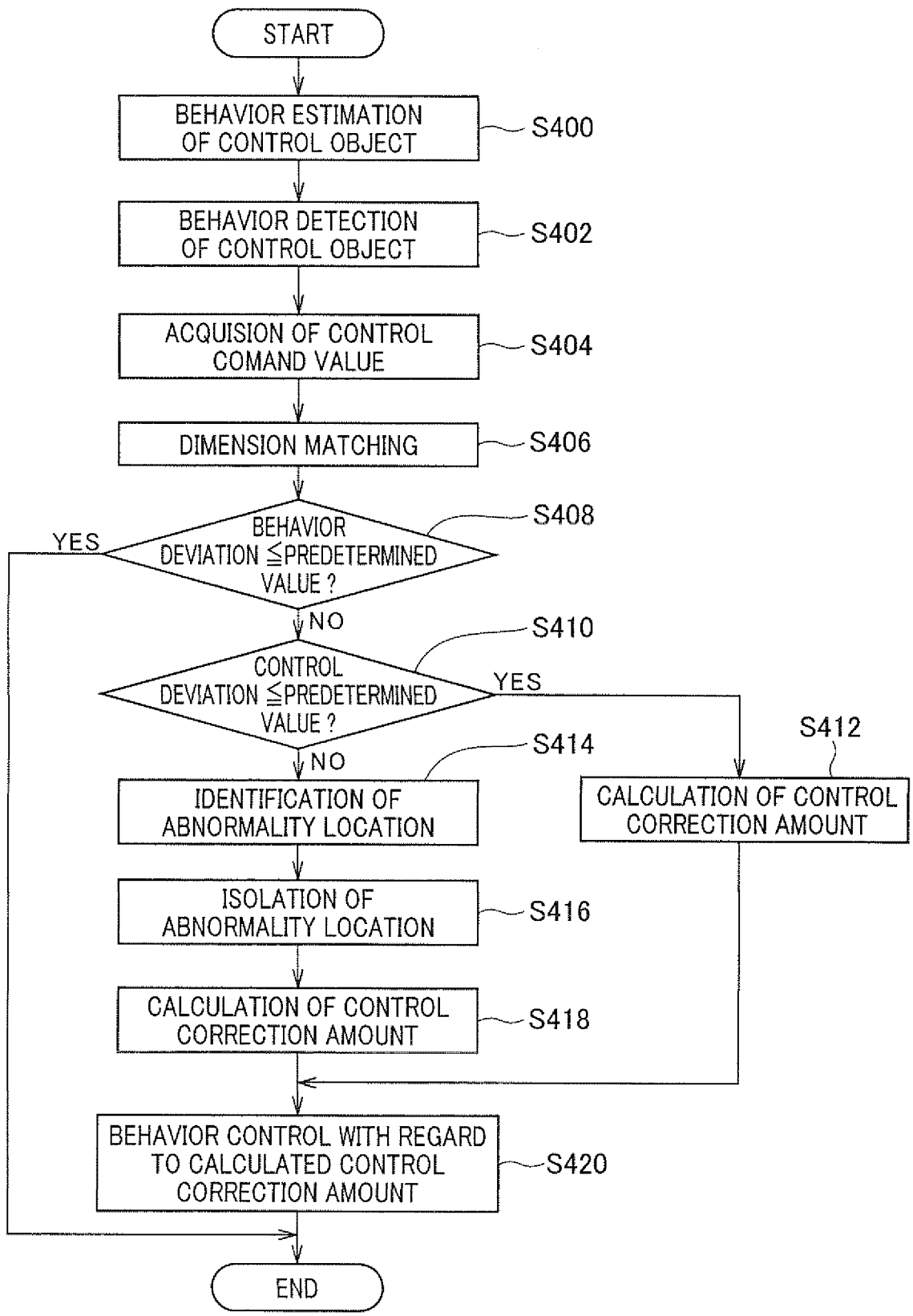
FIG. 13 is a flowchart showing an inspection routine executed by the vehicle inspection apparatus.

Next, the inspecting routine performed continuously to inspect the vehicle is explained with reference to FIG. 13. This routine begins by calculating at step S400 the behavior estimation value of the respective one of the control objects from the foregoing physical model or data base as an estimation model to estimate the behavior of each control object.

At step S402, the vehicle inspection apparatus 50 detects the behavior of the control object being inspected as a behavior detection value from a corresponding sensor signal.

At step S404, the vehicle inspection apparatus 50 acquires the control command value corresponding to the control object from the control section 200.

At step S406, the vehicle inspection apparatus 50 matches the dimensions of the physical quantities of the behavior estimation value, behavior detection value and control command value calculated or acquired at steps S400 to S404 with one another.

Thereafter, at step S408, the vehicle inspection apparatus 50 compares the behavior estimation value with the behavior detection value to determine whether or not the difference between them as a behavior deviation is within a predetermined value. If the determination result at step S408 is affirmative, the routine is terminated.

If the determination result at step S408 is negative, the routine proceeds to step S410 where the vehicle inspection apparatus 50 compares the behavior detection value with the control command value to determine whether or not the difference between them as a control deviation is within a predetermined value. If the determination result at step S410 is affirmative, the vehicle inspection apparatus 50 determines that although the control system is normal, the behavior of the control object is abnormal due to occurrence of an unexpected event. Subsequently, the vehicle inspection apparatus 50 calculates a correction amount of the control command value on the basis of the behavior deviation, the behavior estimation value and the control command value at step S412, and then commands the control section 200 to perform the control in accordance with the calculated correction amount so that the behavior becomes normal.

If the determination result at step S410 is negative, the vehicle inspection apparatus 50 determines that there is an abnormality in the control system. Subsequently the vehicle inspection apparatus 50 identifies at step S414 an abnormality location in the control system on the basis of the diagnosis result on the control object, behavior estimation value and behavior detection value of the control object, and isolates the abnormality location from the control object at step S416. In this case, when there is a location operating in conjunction with the abnormality location, these locations may be isolated together as one group.

In this state where the abnormality location has been isolated from the control system, the vehicle inspection apparatus calculates a correction amount of the control command value at step S420, and commands the control section 200 to perform the control in accordance with the calculated correction amount.

Second Embodiment

Figure 14:
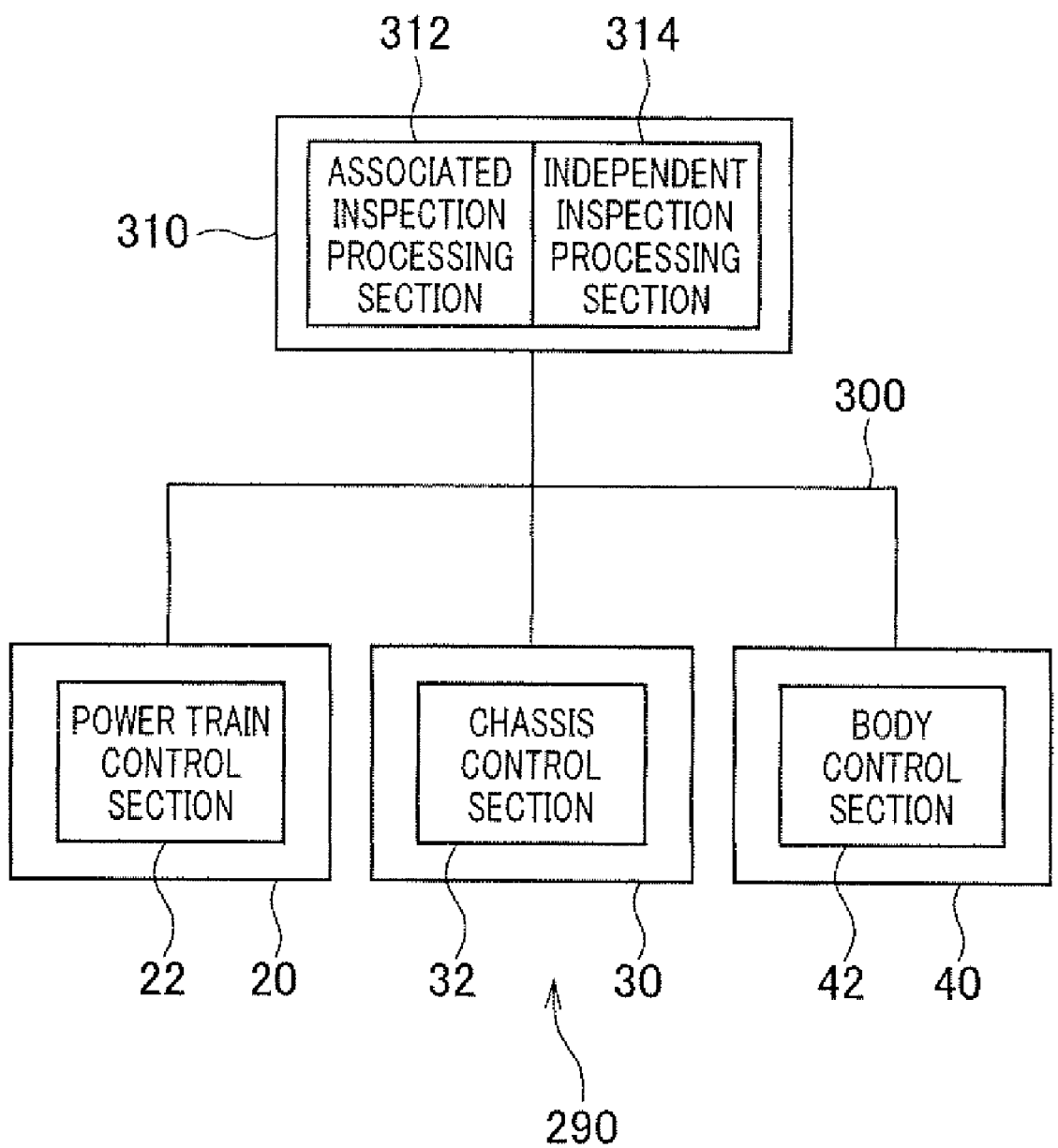
FIG. 14 is a block diagram schematically showing the structure of a vehicle control system including a vehicle inspection apparatus according to a second embodiment of the invention.

FIG. 14 is a diagram schematically showing the structure of a vehicle control system 290 including a vehicle inspection apparatus 310 according to a second embodiment of the invention.

The vehicle inspection apparatus 310 of this embodiment is equivalent to a combination of the associated inspection processing sections 60 and the independent inspection processing sections 100 of their respective functional domains in the first embodiment which have been separated from their respective control sections. The vehicle inspection apparatus 310 inspects the behavior of the whole vehicle.

An associated inspection processing section 312 performs an associated inspecting process not an a functional domain-to-functional domain basis, but for all the control objects of the vehicle. Accordingly, the associated inspection processing section 312 is set differently from the associated inspection processing sections of the respective functional domains in the first embodiment.

An independent inspection processing section 314, which is substantially the same as the independent inspection processing section 100 of the first embodiment, performs an inspection process not associated with any of the control objects.

The vehicle inspection apparatus 310 may share a part of the hardware with the functional domain ECUs 20, 30 and 40, or may be constituted separately from these ECUs.

In the above described embodiments, the associated inspection processing section matches the dimensions of the physical quantities of the behavior estimation value and the behavior detection value of the control object being inspected with the dimension of the control command value outputted from the control section to control the control objects. This makes it possible to divide the inspection processing section of the vehicle inspection apparatus into the associated inspection processing section to perform the inspecting process associated with the control objects, and the independent inspection processing section to perform the inspecting process independent from and not associated with the control objects.

By constituting the vehicle inspection apparatus to include the two different inspection processing sections, the relevant inspection processing section and the independent inspection processing section, it becomes not necessary to modify the relevant inspection processing section when there is change in the control objects to be inspected although the relevant inspection processing section is required to be modified. This makes it possible to reduce the cost for modifying the vehicle inspection apparatus when there is change in the control objects to be inspected and, and also to improve the reliability of the inspection performed by the vehicle inspection apparatus because only a part and not the whole of inspecting process is modified.

It is a matter of course that various modifications can be made to the above described embodiments as described below. The above embodiments describe the vehicle inspection apparatus which inspects the behaviors of a plurality of the control objects on a functional domain-to-functional domain basis, or for the whole vehicle, however, the vehicle inspection apparatus of the present invention may be mounted on a vehicle for each of the control objects in order to inspect the behaviors of a respective one of the control objects. Also in this case, each of the associated inspection processing sections is set to perform an associated one of the control objects, while each one of the independent inspection processing sections performs an independent inspection not associated with any specific one of the control objects. The vehicle inspection apparatus of the present invention includes the independent inspection processing sections irrespective of whether it performs the inspecting process on a control object-to-control object basis, or functional domain-to-functional domain basis, or for the whole vehicle.

In the above embodiments, the functions of the associated inspection processing section, independent inspection processing section, behavior estimating section, behavior detecting section, correction commanding section, abnormality location identifying section and abnormality location isolating section are implemented by executing the process program. However, at least part of the functions of these sections may be implemented by hardware.

The above explained preferred embodiments are exemplary of the invention of the present application which is described solely by the claims appended below. It should be understood that modifications of the preferred embodiments may be made as would occur to one of skill in the art.

What is claimed is:

1. A vehicle inspection apparatus, including a processor and a memory storing a program for execution by the processor, for inspecting behavior of at least one control object mounted on a vehicle whose behavior is controlled through behavior control performed by a control section included in a control system mounted on said vehicle in accordance with a behavior request inputted from an external device, the program comprising:

an associated inspection processing section set to perform an associated inspecting process associated with said control object; and an independent inspection processing section configured to perform an independent inspecting process not associated with and independent from said control object;

wherein said associated inspection processing section includes:

a behavior detecting section to detect, as a behavior detection value, behavior of said control object reflecting a control command value outputted from said control section;

a behavior estimating section to estimate, as a behavior estimation value, behavior of said control object on the basis of said behavior request;

a dimension matching section to match dimensions of physical values of said behavior detection value and said behavior estimation value with each other; and wherein said independent inspection processing section includes a behavior judging section to judge whether or not said control object is abnormal on the basis of a deviation between said behavior detection value and said behavior estimation value as a behavior deviation, whose dimensions have been matched with each other by said dimension matching section;

a behavior vector splitting section configured to perform vector splitting on a magnitude and direction of the behavior estimation value of a functional domain for each of the at least one control object; and a correction amount calculating section configured to receive as inputs a behavior correction value of the at least one control object and a corresponding control command value from the control section, and to calculate a correction amount of the control command value outputted from the control section to an abnormal control object in order to improve behavior of the abnormal control object or an abnormal functional domain.

2. The vehicle inspection apparatus according to claim 1, wherein said behavior estimating section estimates behavior of said control object on the basis of a physical model inputted with said behavior request and set in accordance with a characteristic of said control object, and a parameter which is specific to said vehicle and characterizes said physical model.

3. The vehicle inspection apparatus according to claim 1, wherein said behavior judging section judges whether there is a behavior abnormality in said control object on the basis of a ratio between said behavior estimation value and said behavior detection value.

4. The vehicle inspection apparatus according to claim 1, wherein said dimension matching section matches said dimensions of said behavior estimation value and said behavior detection value with a dimension of said control command value, and said behavior judging section judges after judging that said control object is abnormal, whether or not a cause of abnormality of said control object is due to said control system on the basis of a deviation between said behavior detection value and said control command value as a control deviation, whose dimensions have been matched with each other by said dimension matching section.

5. The vehicle inspection apparatus according to claim 4, wherein said associated inspection processing section includes an abnormality location identifying section to identify an abnormality location in said control system when said behavior judging section judges that said control system is abnormal.

6. The vehicle inspection apparatus according to claim 5, wherein said associated inspection processing section includes an abnormality location isolating section to isolate an abnormality location identified by said abnormality location identifying section.

7. The vehicle inspection apparatus according to claim 6, wherein said abnormality location isolating section isolates, together with said identified abnormality location, a location in said control system which operates in conjunction with said identified abnormality location.

8. The vehicle inspection apparatus according to claim 6, wherein the correction amount calculating section forms part of a correction commanding section which is configured to calculate the correction amount of said control command value on the basis of said behavior deviation, said behavior estimation value and said control command value when said behavior judging section judges that behavior of said control object is abnormal on the basis of said behavior deviation and after said abnormality location isolating function isolates said abnormality location from said control system, and to command said control section to control behavior of said control object with regard to said calculated correction amount.

9. The vehicle inspection apparatus according to claim 1, wherein the correction amount calculating section forms part of a correction commanding section which is configured to calculate the correction amount of said control command value on the basis of said behavior deviation, said behavior estimation value and said control command value when said behavior judging section judges that behavior of said control object is abnormal on the basis of said behavior deviation, and to command said control section to control behavior of said control object with regard to said calculated correction amount.

10. The vehicle inspection apparatus according to claim 1, wherein said associated inspection processing section is configured to perform said associated inspecting process for a plurality of control objects, and said independent inspection processing section is configured to perform said independent inspecting process for said plurality of said control objects.

11. The vehicle inspection apparatus according to claim 10, wherein said associated inspection processing section is configured to perform said associated inspecting process for the whole vehicle, and said independent inspection processing section is configured to perform said independent inspecting process for the whole vehicle.

12. The vehicle inspection apparatus according to claim 1, wherein said associated inspection processing section and said independent inspection processing section are constituted of the same processing device.

13. The vehicle inspection apparatus according to claim 12, wherein said associated inspection processing section and said independent inspection processing section are constituted of different processing devices for each other.

14. The vehicle inspection apparatus according to claim 1, wherein said control section, said associated inspection processing section and said independent inspection processing section are constituted of the same processing device, said processing device including a protecting function to enable said control section, said associated inspection processing section and said independent inspection processing section to operate without interfering with one another.

15. The vehicle inspection apparatus according to claim 14, wherein said associated inspection processing section and said independent inspection processing section respectively perform said associated inspecting process and said independent inspecting process for one of a plurality of control objects which is different from another one of said plurality of said control objects whose behavior is being controlled by said control section.

16. The vehicle inspection apparatus according to claim 15, wherein said processing device includes a first computation unit to execute programs for implementing said independent inspecting process and said associated inspecting process, and a second computation unit to execute a program for implementing said behavior control, said associated inspection processing section and said independent inspection processing section being supplied with electric power from a power supply different from a power supply which supplies electric power to said control section.

17. The vehicle inspection apparatus according to claim 14, wherein said processing device includes a first computation unit to execute programs for implementing said independent inspecting process and said associated inspecting process, and a second computation unit to execute a program for implementing said behavior control, said associated inspection processing section and said independent inspection processing section being supplied with electric power from a power supply different from a power supply which supplies electric power to said control section.

* * * * *